(12) United States Patent
Kinoshita

(10) Patent No.: US 7,111,164 B2
(45) Date of Patent: Sep. 19, 2006

(54) CRISIS MANAGEMENT SYSTEM, COMPUTER, AND COMPUTER MEMORY PRODUCT

(75) Inventor: Kiyotaka Kinoshita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 970 days.

(21) Appl. No.: 09/875,861

(22) Filed: Jun. 8, 2001

(65) Prior Publication Data

US 2001/0052082 A1     Dec. 13, 2001

(30) Foreign Application Priority Data

Jun. 13, 2000   (JP)   ............................. 2000-177635

(51) Int. Cl.
  *H04L 9/00*   (2006.01)
  *G06F 11/00*  (2006.01)
  *G08B 29/00*  (2006.01)
  *H04K 1/00*   (2006.01)
  *H04M 11/04*  (2006.01)

(52) U.S. Cl. .......................... 713/166; 713/186; 707/9; 705/51; 726/7; 726/23; 726/25

(58) Field of Classification Search ................ 713/186, 713/310, 193, 165, 166, 152, 201; 707/9; 705/51; 726/7, 23, 25
See application file for complete search history.

(56) References Cited

U.S. PATENT DOCUMENTS

| | | | | |
|---|---|---|---|---|
| 5,185,697 A * | 2/1993 | Jacobs et al. | ................... | 379/45 |
| 5,689,233 A * | 11/1997 | Kurisu et al. | ................ | 340/506 |
| 5,805,719 A * | 9/1998 | Pare et al. | ................... | 382/115 |
| 5,896,530 A * | 4/1999 | White | ......................... | 718/102 |
| 6,205,551 B1 * | 3/2001 | Grosse | .......................... | 726/25 |
| 6,279,113 B1 * | 8/2001 | Vaidya | ......................... | 726/23 |
| 6,301,668 B1 * | 10/2001 | Gleichauf et al. | ............. | 726/25 |
| 6,321,338 B1 * | 11/2001 | Porras et al. | ................... | 726/25 |
| 6,347,384 B1 * | 2/2002 | Satomi et al. | ................ | 714/57 |
| 6,392,538 B1 * | 5/2002 | Shere | ..................... | 340/539.26 |
| 6,542,075 B1 * | 4/2003 | Barker et al. | ................ | 340/506 |
| 6,681,331 B1 * | 1/2004 | Munson et al. | ................ | 726/23 |
| 6,839,850 B1 * | 1/2005 | Campbell et al. | ............. | 726/23 |

FOREIGN PATENT DOCUMENTS

| | | |
|---|---|---|
| JP | 8-44989 | 2/1996 |
| JP | 8-51405 | 2/1996 |
| JP | 9-147300 | 6/1997 |
| JP | 10-116023 | 5/1998 |
| JP | 10-240690 | 9/1998 |
| JP | 10-334078 | 12/1998 |
| JP | 11-53668 | 2/1999 |
| JP | 11-316781 | 11/1999 |
| JP | 11-338795 | 12/1999 |
| JP | 2000-48073 | 2/2000 |
| JP | 2000-163671 | 6/2000 |

* cited by examiner

OTHER PUBLICATIONS

Western Telematic Inc., "RPB+ Remote Power Boot Switch," User Guide, Mar. 2000.*

*Primary Examiner*—Jacques H. Louis-Jacques
*Assistant Examiner*—Michael J. Simitoski
(74) *Attorney, Agent, or Firm*—Staas & Halsey LLP

(57) ABSTRACT

A server computer simulates an incident, and accurately gathers information to be provided to communication terminal apparatuses 2a, 2b and 2c. The server computer 1 performs authentication based on biometric information and an access permission level. With this, the present invention enhances security. Information provision is efficiently performed based on sequence information. The server computer gathers hardware information of a terminal apparatus to which information is to be provided. Based on the hardware information, the server computer edits the information.

14 Claims, 15 Drawing Sheets

FIG. 3

FILE(F) EDIT(E) DISPLAY(V) JUMP(G) HELP(H)

BACK FORWARD RELOAD HOME SEARCH GUIDE PRINT STOP

BOOKMARK  JUMP TO [_____▼]   RELATED SITE

| HIJACK | AIRPORT ACCIDENT | NATURAL DISASTER | CRASH | DELAY | OTHERS | ... |

NUMBER OF CASUALTIES [▼] (PERSON)   NUMBER OF PASSENGERS [▼] (PERSON)   FLIGHT CONDITION ○
FIRE BREAKS OUT Yes ○ NO ○   FREIGHT Yes ○ NO ○   DURING PREPARATION FOR TAKEOFF ○
PILOT ALIVE   Yes ○ NO ○   NUMBER OF HOSTAGE [▼] (PERSON)   DURING PREPARATION FOR LANDING ○
KIND OF WEAPON HAND GAN ○ MACHINE GAN ○ BOMB ○   DURING FLIGHT ○
JAPANESE SWORD ○ KNIFE ○   REMAINING AMOUNT OF FUEL [▼] (ℓ)
NUMBER OF HIJACKERS [▼] (PERSON)   INTERNATIONAL FLIGHT Yes ○ NO ○
POLITICAL OFFENSE Yes ○ NO ○   SINGLE-HANDED OFFENSE Yes ○ NO ○

ENTER SUPPLEMENTAL DATA

[ OK ]

DOCUMENT COMPLETED

FIG. 4A

CASE DATA FILE
(DB OF DISASTERS IN COUNTRIES OF THE WORLD)

| CLASSIFI-CATION | KIND OF ACCIDENT | DETAILS | | | | |
|---|---|---|---|---|---|---|
| | | CONDITION | DATE AND TIME | DAMAGE | NUMBER OF INJURED PERSONS | SUMMERY OF INCIDENT HANDLING |
| AIRPORT ACCIDENT | COMPLETE COLLAPSE | DURING TAKEOFF OR LANDING | 9999 | Xxxx… | | Xxxxx… |
| | COMPLETE COLLAPSE | DURING FLIGHT | 9999 | Xxxx… | | Xxxxx… |
| HIJACK | SINGLE-HANDED OFFENSE | DURING TAKEOFF OR LANDING | 9999 | Xxxx… | | Xxxxx… |
| | POLITICAL OFFENSE | DURING FLIGHT | 9999 | Xxxx… | | Xxxxx… |
| NATURAL DISASTER | EARTH-QUAKE | SEISMIC INTENSITY SCALE | 9999 | Xxxx… | | Xxxxx… |
| | TYPHOON | SCALE | 9999 | Xxxx… | | Xxxxx… |
| | | … | … | … | … | .. |

FIG. 4B

| DETAILS OF TROUBLE SOLVING |||
|---|---|---|
| PROCEDURE OF INCIDENT HANDLING | POINTS OF SOLUTION | COOPERATION WITH ASSOCIATED AGENCY |
| ①…@… | ①…@… | ①…@… |
| ①…@… | ①…@… | ①…@… |
| ①…@… | ①…@… | ①…@… |
| ①…@… | ①…@… | ①…@… |
| ①…@… | ①…@… | ①…@… |
| ①…@… | ①…@… | ①…@… |

FIG. 5

CHARACTERISTIC REGISTRATION FILE

| | HIJACK | AIRPORT ACCIDENT | NATURAL DISASTER | CRASH | ... | | ... |
|---|---|---|---|---|---|---|---|
| | | CONDITION | NUMBER OF CASUALTIES | NUMBER OF PASSENGERS | ... | KIND OF WEAPON | ... |
| SINGLE-HANDED OFFENCE TYPE·A | | DURING PREPARATION FOR TAKEOFF | 5 OR MORE | OO OR MORE | ... | ... | ... |
| SINGLE-HANDED OFFENCE TYPE·B | | DURING FLIGHT | 3 OR MORE | Ox OR MORE | ... | ... | ... |
| ... | | ... | ... | ... | ... | ... | ... |
| POLITICAL OFFENCE TYPE·A | | DURING PREPARATION FOR TAKEOFF | 10 OR MORE | xO OR MORE | ... | ... | ... |
| POLITICAL OFFENCE TYPE·B | | DURING FLIGHT | 5 OR MORE | xx OR MORE | ... | ... | ... |
| ... | | ... | ... | ... | ... | ... | ... |

FIG. 7

HARDWARE INFORMATION REGISTRATION PORTION

| MODEL CODE | HARDWARE TYPE | SCREEN SIZE (NUMBER OF DOTS) | NUMBER OF COLORS | NUMBER OF FRAMES OF MOVING IMAGE DATA PER SECOND | MEMORY CAPACITY | EXTERNAL STORAGE CAPACITY |
|---|---|---|---|---|---|---|
| SI-O×3 | PORTABLE TELEPHONE | 64×64 | 256 | 5 | 1MB | — |
| △O-AB | PC TYPE1 | 1024×768 | 65 THOUSAND | 15 | 64MB | 10GB |
| O×-120 | PC TYPE2 | 1024×768 | 1.77 MILLION | 30 | 64MB | 30GB |
| ... | ... | ... | ... | ... | ... | ... |

FIG. 8

AUTHENTICATION DATA FILE

| ID | JOB TITLE | NAME | PASSWORD | FINGERPRINT DATA/ VOICE DATA | ACCESS PERMISSION LEVEL |
|---|---|---|---|---|---|
| 0105 | DISPATCHER | ○×△ | ***** | — | 3 |
| 0205 | TRAVEL AGENTS | △○○ | ***** | — | 1 |
| 0351 | PILOT | ×○○ | ***** | — | 2 |
| ... | ... | ... | ... | ... | ... |

CRISIS MANAGEMENT SYSTEM, COMPUTER, AND COMPUTER MEMORY PRODUCT

BACKGROUND OF THE INVENTION

Field of the Invention

The present invention relates to a crisis management system that is executed between a server computer and a terminal apparatus connected to each other through a communication network, and transmits and receives necessary information in response to an occurrence of an incident. More particularly, the present invention relates to a crisis management system, a computer, and a computer memory product in which an incident that occurs at an airport is managed by a server computer and emergency information is provided to a terminal apparatus placed outside the airport.

In recent years, the importance of crisis management has been recognized. When an incident (emergency) such as an earthquake or a coup occurs, it is required to promptly provide information to the parties concerned. For example, when a hijack or an accident occurs at an airport, it is necessary to promptly and accurately gather information such as damage, passengers' safety, the passenger list, arrangements for ambulances and whether the incident has been reported to the police or not.

It is also necessary to promptly and accurately provide the gathered information to the managers (for example, the dispatcher) who are outside the airport. This applies to a case where a national-level incident occurs.

Management of information within an airport is disclosed in Japanese Laid-open Patent Application No. H09-147300. However, this is merely management within an airport and is not for providing information on an incident to persons outside the airport.

When an incident occurs, it is common practice to perform the following: Staff members within the airport gather and sum up information such as damage, and then, verbally report the information such as damage to the managers outside the airport by telephone or the like. The managers rush to the airport to deal with the incident.

When an incident occurs and necessary information is provided to the managers outside the airport, promptness is required first of all. However, calling all the managers by telephone or the like takes much time and is unreliable. In addition, since the managers are conventionally called by telephone or the like, the managers outside the airport can receive necessary information such as damage from the staff only verbally. For this reason, it is difficult for the managers to provide the staff within the airport with detailed instructions on how to deal with the incident.

Moreover, the information must be provided promptly. However, the information includes secret information. Therefore, if the information is provided unconditionally, secret information leaks. Information with high confidentiality (for example, the passenger list in the case of a hijack, or information in the case of a kidnapping) should be provided only to specific persons. It is unnecessary to provide third parties with secret information. Secret information must be provided after the persons to be provided with information are reliably authenticated and it is determined whether the information may be provided to the persons or not.

Moreover, the information must be efficiently provided in view of the importance of the incident. For example, when an accident occurs, it is desirable that information be provided in good sequence such that information on the general situation is provided first and then, information such as the presence or absence of casualties and whether the accident has been reported to the police or not is provided.

Moreover, such incidents usually occur unexpectedly. Therefore, there are cases where a manager such as the dispatcher or a national party concerned is sleeping, driving or out on the road. The information must be provided with reliability even in such cases.

Further, when a manager is sleeping, it is necessary to awake him by automatically activating a computer or sounding an alarm. When a manager is at home, it is sufficient only to provide the information to the computer placed in his home. However, when a manager is not home, it is necessary to transmit the information to a different kind of hardware according to his whereabouts, such as to his portable telephone when he is out on the road and to a car-mounted computer when he is driving. Therefore, it is necessary to provide the information in a format suitable for the hardware. For example, in the case of a portable telephone which is low in transmission speed and small in display screen, data such as moving image data must be transmitted with the number of frames largely reduced.

BRIEF SUMMARY OF THE INVENTION

The present invention is made in view of such circumstances. A first object of the present invention is to provide a crisis management system, a computer and a computer memory product providing high confidentiality and being capable of, when an incident occurs, efficiently transmitting information to the managers outside the spot of the incident, reliably authenticating the managers to be provided with information, and restricting the information to be provided according to the qualifications or the levels of the managers.

A second object of the present invention is to provide a crisis management system and a computer capable of, when information is provided to the manager outside, efficiently providing the information in the most suitable sequence according to the kind of the incident.

A third object of the present invention is to provide a crisis management system and a computer capable of automatically activating an external terminal apparatus, editing information to be provided, in accordance with the kind of the terminal apparatus placed outside the spot of the incident, and reliably providing the information irrespective of the whereabouts of the managers.

When an incident occurs, the server computer of the crisis management system according to the present invention accepts information concerning the incident entered by an operator such as the kind of the incident and the presence or absence of casualties. In the characteristic registration file of the server computer, characteristics (for example, the kind of the hijacker's weapon, the number of casualties, the presence or absence of a fire, the condition of the pilot, the precipitation, or the maximum instantaneous wind speed) of each incident (emergency such as a hijack, an accident during takeoff or landing, or a rainstorm) are preregistered as templates based on past cases and the like. The server computer compares the input information concerning the incident and the characteristic information file by a technique such as pattern matching. The server computer identifies the kind of the currently occurring incident.

In the incident handling information file of the server computer, the items of information to be provided and the access levels (confidentiality levels) of the items are registered for each of the incident type. The server computer gathers the information to be provided associated with the identified incident with reference to the incident handling information file. The information to be gathered includes, in the case of an accident at an airport (for example, an accident caused by a failure in landing), the image information of the relay from the spot, information on the passenger list, information on the casualties and information on an alternate flight.

Then, the server computer transmits to the terminal apparatuses the gathered information to be provided. The managers outside the airport such as the dispatcher can grasp the incident promptly and easily.

For the information associated with each item of information to be provided, an access level is registered as mentioned above. For example, when the person to be provided with information is the dispatcher (with the highest access level), the person can be provided with all the information. However, when the person to be provided with information is merely a travel agent (with a middle access level), the person cannot access to information with a high access level (for example, information on the relay from the spot or secret information), and can be provided with only information with a low access level (for example, information on the passenger list or information on an alternate flight).

As described above, the present invention restricts access to the information to be provided, according to the access permission level of the person to be provided with information. Consequently, the present invention can maintain confidentiality.

Moreover, the terminal apparatus accepts identification information including the identifier uniquely assigned to each manager and the biometric information (a finger print or the voice) of the manager. The terminal apparatus transmits the accepted identification information to the server computer. The server computer authenticates the person trying to receive information. Further, the server computer checks the access permission level.

As described above, the present invention authenticates the validity and the access permission level of the person to be provided with information by biometric authentication. Consequently, the present invention can provide an information provision system with extremely high security.

Moreover, according to the present invention, the information to be provided transmitted from the server computer to the terminal apparatus is transmitted in preregistered sequence information. For example, in the case of a plane accident, the server computer preregisters sequence information in accordance with the significance such that the image information of the relay from the spot is assigned sequence 1, the accident circumstance information, sequence 2, and the casualty information, sequence 3. The server computer transmits the information to be provided according to the sequence information.

As described above, the server computer transmits the information to be provided in accordance with the significance. Consequently, the managers outside the spot of the incident can efficiently grasp the information.

A manager receives pieces of information with sequence information 1 to 2 through his portable telephone (terminal apparatus) while out for shopping. Then, the manager hurries home and activates the terminal apparatus in his home. In this case, the pieces of information with sequence information 3 and 4 are displayed on the terminal apparatus in his home. Thus, the manager can promptly and efficiently obtain information.

Moreover, when authentication information is transmitted from the terminal apparatus to the server computer, hardware information of the terminal apparatus is also transmitted to the server computer. For example, when the terminal apparatus is a portable telephone, the terminal apparatus (portable telephone) transmits information such as the model code of the portable telephone. Then, the server computer having received the information edits the information to be provided, in accordance with the specifications of the hardware to which the information is to be transmitted.

For example, when the terminal apparatus to which information is to be transmitted is a portable telephone, the transmission speed is low and the memory capacity is small. Therefore, moving images are transmitted with the number of frames largely reduced. Moreover, the server computer divides text data into some parts for transmission.

As described above, the contents to be transmitted are edited in accordance with the kind of the hardware to which information is to be transmitted. Consequently, the managers outside the spot of the incident can receive information irrespective of the kind of the hardware receiving the information. Moreover, the managers can receive information with reliability even outside their homes.

Further, the system of the present invention has a power supply and interrupt apparatus that supplies and interrupts power to the terminal apparatus. The power supply and interrupt apparatus receives an incident occurrence signal from the server computer. When receiving the incident occurrence signal, the power supply and interrupt apparatus supplies power to the terminal apparatus.

That is, when an abnormal incident occurs, the present system activates the terminal apparatuses by using of the power supply and interrupt apparatus, and forcibly notifies the occurrence of the incident to the managers.

Consequently, the present invention can reliably transmit information and save energy.

The above and further objects and features of the invention will more fully be apparent from the following detailed description with accompanying drawings.

BRIEF DESCRIPTION OF THE SEVERAL VIEWS OF THE DRAWINGS

FIG. 3 is an explanatory view showing a screen of a display portion for entering information on an incident from an input portion;

FIGS. 4A and B are explanatory view showing the database configuration of a case data file;

FIG. 5 is an explanatory view showing the database configuration of a characteristic registration file;

FIG. 7 is an explanatory view showing the database configuration of a hardware information registration portion;

FIG. 8 is an explanatory view showing the database configuration of an authentication data file;

DESCRIPTION OF THE PREFERRED EMBODIMENTS

First Embodiment

Figure 1:
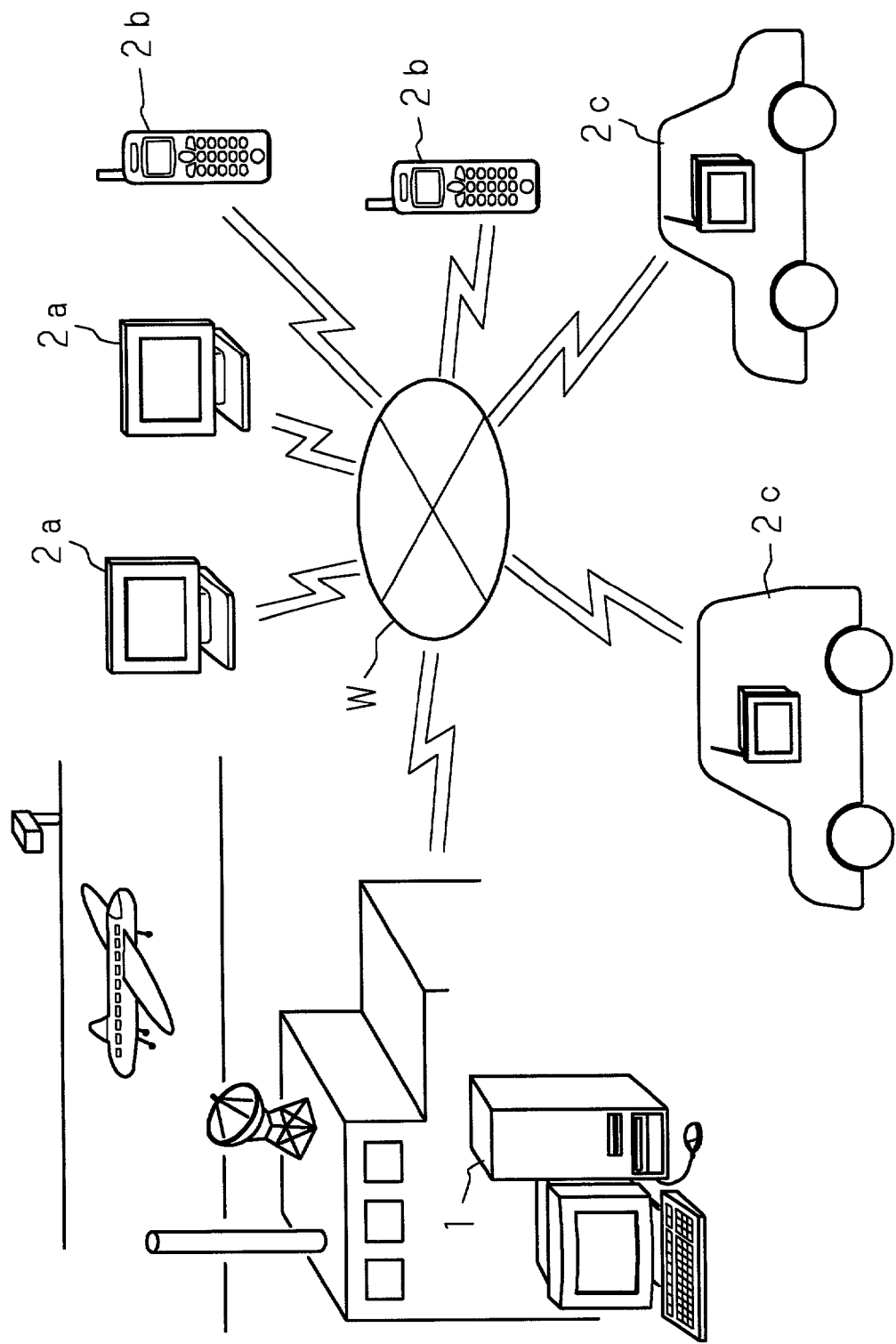
FIG. 1 is a schematic view showing a crisis management system according to the present invention.

FIG. 1 is a schematic view showing a crisis management system according to the present invention. In the figure, reference numeral 1 represents a server computer that collectively manages crisis management information. The server computer 1 is placed, for example, in an airport as shown in the figure. The server computer 1 records image data output from a television camera or the like. The server computer 1 performs information gathering such as a passenger list. The server computer 1 transmits information to terminal apparatuses 2a, terminal apparatuses 2b, terminal apparatuses 2c or a non-illustrated agency such as the police.

The server computer 1 is connected through a communication network W to the terminal apparatuses 2a placed in the homes of the managers outside the airport (for example, the dispatcher, travel agents, pilots, police officers, firepersons, and Cabinet ministers), the terminal apparatuses 2b such as portable telephones, and the car-mounted terminal apparatuses 2c (hereinafter, referred to as terminal apparatuses 2).

Figure 2:
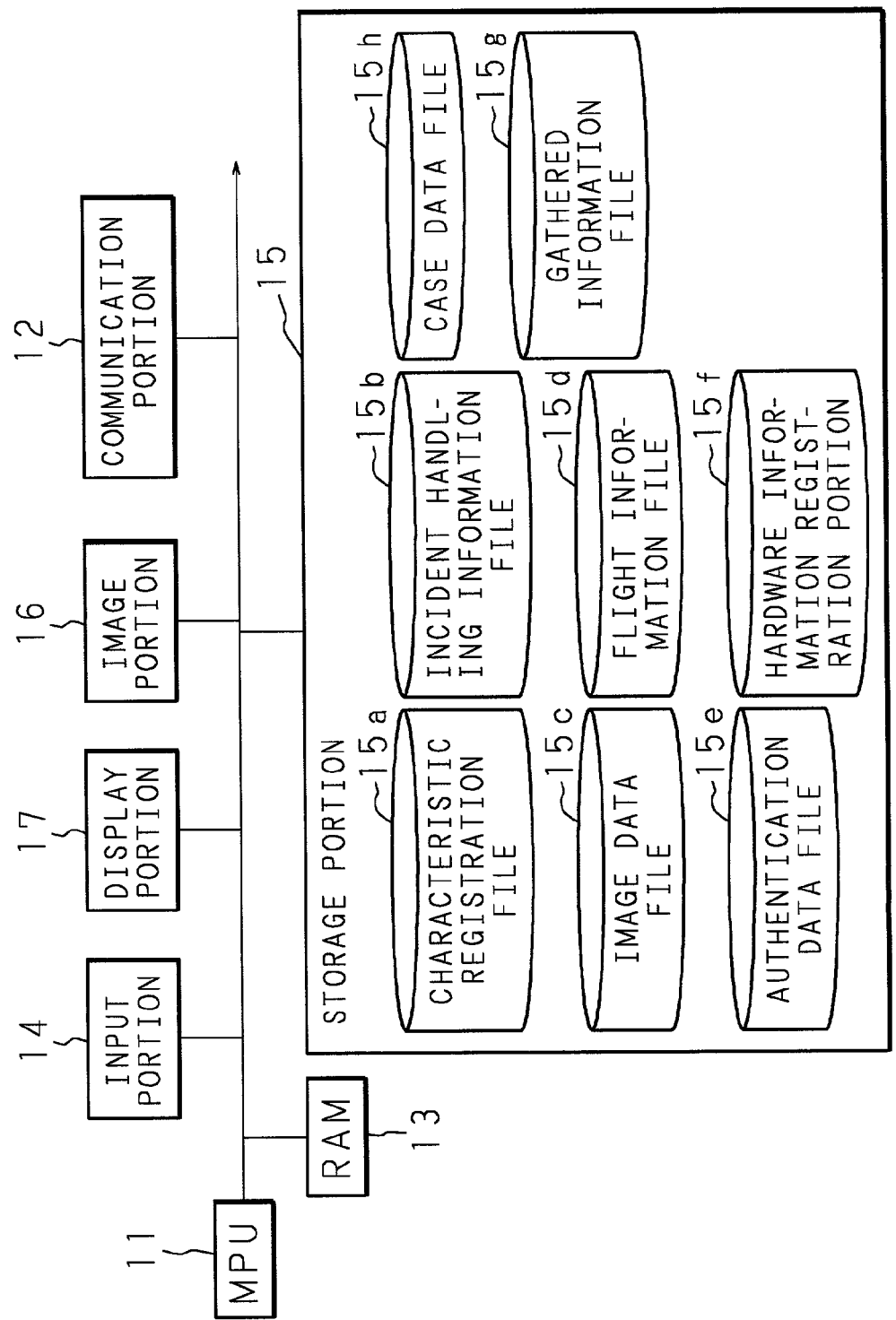
FIG. 2 is a block diagram showing the hardware configuration of a server computer.

FIG. 2 is a block diagram showing the hardware configuration of the server computer 1. In the figure, reference numeral 12 represents a communication portion that transmits and receives information to and from the terminal apparatuses 2 through the communication network W. The server computer 1 has an input portion 14 such as a keyboard. When an incident occurs, an operator within the airport enters damage while viewing a display portion 17 (see FIG. 3).

An MPU 11 stores the entered information concerning the incident into a RAM 13. In a storage portion 15 such as a hard disk, various files are stored. Details of these files will be described later.

When an accident or the like that occurs on the spot is shot, the MPU 11 controls an imaging portion 16 such as a video camera. The MPU 11 stores the image data into an image data file 15c in the storage portion 15.

FIG. 3 is an explanatory view showing a screen of the display portion 17 for entering information on an incident from the input portion 14. When an incident occurs, an operator within the airport enters the present situation on the browser shown in FIG. 3 from the input portion 14. First, to specify the incident, the operator selects one tab from among the listed tabs (hijack, airport accident, natural disaster, etc.). FIG. 3 shows a case where the hijack tab is selected.

Items such as the number of casualties, the number of passengers and the kind of the weapon possessed by the hijacker are entered. To enter items for which no boxes are provided, letters are directly entered into the supplemental data text box. For example, when a French person is injured in the hijack, the operator enters "A doctor who understands French is required." When an alternate flight is required, the operator enters the flight number or the like.

FIGS. 4 and B are explanatory view showing the database configuration of a case data file 15h. In the case data file 15h, details of the damage caused in incidents that occurred in various countries of the world are accumulated. In addition, information such as how troubles were solved is accumulated in the case data file 15h. These pieces of information are entered one by one by the operator from the input portion 14.

For example, as shown in FIG. 4, the operator classifies an incident as an airport accident, a hijack, a natural disaster or the like, and then, enters details such as the date and time, the damage and the number of casualties. The operator also registers the solution to the incident. For example, the operator registers procedures and points of the solution and cooperation with an associated agency such as the police or a hospital.

FIG. 5 is an explanatory view showing the database configuration of a characteristic registration file 15a. In the characteristic registration file 15a, the operator registers characteristics of each incident with reference to the case data file 15h. That is, in the characteristic registration file 15a, model incidents are registered as templates.

Since various cases are assumed as hijacks, as shown in FIG. 5, various templates are registered in the characteristic registration file 15a. The MPU 11 compares the pieces of data entered on the screen shown in FIG. 3 and stored in the RAM 13 with the registered templates by a technique such as pattern matching. The MPU 11 identifies the coinciding or analogous template. By this, the kind of the incident (for example, hijack criminal offense TYPE•B) is identified.

Figure 6:
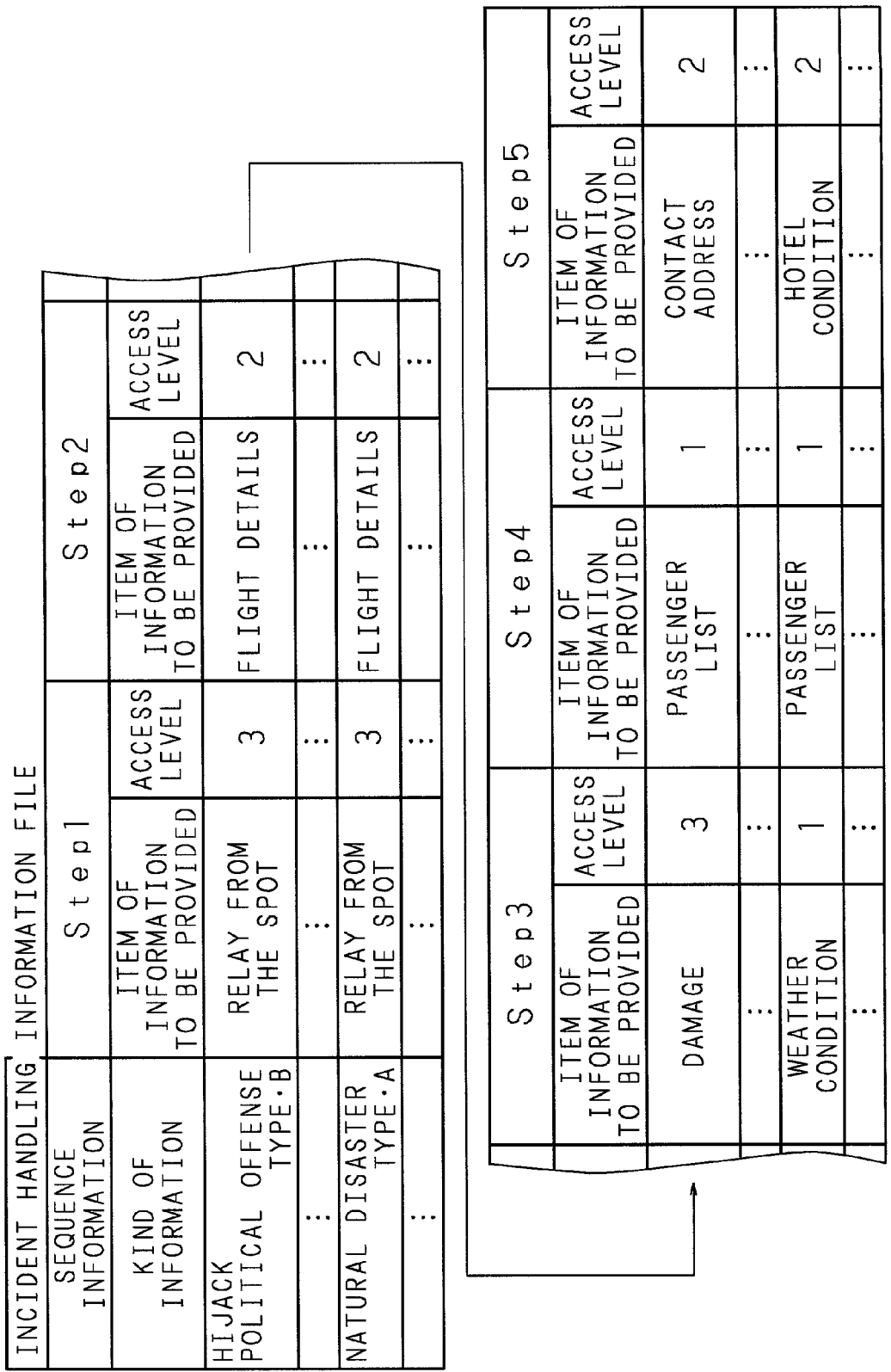
FIG. 6 is an explanatory view showing the database configuration of an incident handling information file.

The storage portion 15 includes an incident handling information file 15b. FIG. 6 is an explanatory view showing the database configuration of the incident handling information file 15b. In the incident handling information file 15b, a plurality of items of information to be provided are preregistered for each of the incident type (hijack political offense TYPE•B, . . . , natural disaster TYPE•A, etc.). For example, when the incident type is hijack political offense TYPE•B, in the incident handling information file 15b, items such as the following are registered: an image relayed from the spot which image is taken by the imaging portion 16 (relay from the spot); detailed information on the flight such as the departure time, the arrival time, the flight number, whether the flight is a freight or not and the number of passengers; and damage such as casualties and the presence or absence of a fire.

For each of the items of information to be provided, a threshold value for releasing the information, that is, an access level is provided. To a person for whom it is necessary to grasp all the information within the airport such as the dispatcher outside the airport, the highest access permission level (for example, 3) is assigned. To travel agents to whom it is unnecessary to provide secret information, a low access level (for example, 1) is assigned.

For each of the items of information to be provided, an access level is also registered. For example, for the items the confidentiality of which must be maintained such as the relay from the spot and the damage, access level 3 is registered. Conversely, for the items which may be released to travel agents such as the passenger list, access level 1 is registered.

To a travel agent with access level 1, only information with access permission level 1 or lower is provided (information with access level 2 and information with access level 3 are not provided). A person with access permission level 3 such as the dispatcher can be provided with information with access level 3 or lower, that is, all the information (information with access levels 1 to 3 can all be provided). Consequently, the protection of the secret information is ensured.

Further, in the incident handling information file 15b, the sequence information in which the information is to be provided is preregistered. As shown in FIG. 6, sequence information for information transmission to the terminal apparatuses 2 such that the relay from the spot in STEP 1 is provided first and then, the flight details in STEP 2 are provided is preregistered. When the kind of the incident is identified, the server computer 1 gathers information to be provided. The items of information to be gathered are decided in consideration of the incident handling information file 15b. For example, when the kind of the incident is hijack political offense TYPE•B, the server computer 1 gathers information such as the relay from the spot and the flight details. To gather the relay from the spot, an image of the scene of the hijack taken by the imaging portion 16 is recorded onto the image data file 15c in the recording portion 15. The flight details are gathered in consideration of a flight information file 15d in which details of flights are registered.

Moreover, the operator or the server computer 1 gathers supplemental information not included in the items of information to be provided of the incident handling information file 15b. The supplemental information is gathered based on the contents entered in the text box in FIG. 3. Then, the server computer 1 registers the gathered information into a gathered information file 15g.

When the kind of the incident is natural disaster TYPE•A, the server computer 1 gathers the weather condition from a non-illustrated weather forecast database. Then, the MPU 11 stores the gathered information into the gathered information file 15g. The MPU 11 transmits the stored contents one by one to the terminal apparatuses 2 according to the predetermined access level and sequence information.

The RAM 13 updates the sequence information every time a piece of information is transmitted. For example, when the relay from the spot in STEP 1 is transmitted first, a value 1 is stored in the RAM 13. When the flight details in STEP 2 are transmitted, the value 1 stored in the RAM 13 is incremented to 2. With this configuration, even when information transmission is interrupted for some reason, the next information (the damage in STEP 3) can be transmitted in time sequence.

The operator enters the access level and sequence information of the supplemental information.

FIG. 7 is an explanatory view showing the database configuration of a hardware information registration portion 15f. In the hardware information registration portion 15f, specifications, such as the screen size, the number of colors and the internal memory, of the terminal apparatuses 2 to be provided with information are registered. That is, no problem arises when the terminal apparatuses to be provided with information are terminal apparatuses 2a such as computers having a sufficient CPU and memory. However, when information is transmitted to the terminal apparatuses 2b such as portable telephones, the server computer 1 edits the data amount in accordance with the performance of the terminal apparatuses 2b.

When the terminal apparatuses 2 transmit a reception request packet to the server computer 1 to request information provision, the packet includes hardware information (for example, the model code). The MPU 11 edits the information to be provided stored in the gathered information file 15g based on the transmitted hardware information and the hardware information registration portion 15f.

For example, when there is a reception request from the terminal apparatuses 2b (portable telephones), the MPU 11 reduces the number of frames of moving image data related to the relay from the spot. The number of frames is reduced, for example, from 30 per second to approximately 5 per second. The passenger list is divided into a plurality of parts for transmission.

FIG. 8 is an explanatory view showing the database configuration of an authentication data file 15e. In the authentication data file 15e are registered the identifier (ID), the job title, the name, the password and the like unique to each of the managers to be provided with information (the dispatcher, travel agents, pilots, police officers, fire persons, Cabinet ministers, etc.).

To prevent a third party from hacking and posing as a manager to be provided with information, in the authentication data file 15e, biometric information of each manager such as a fingerprint, the voice, the retina pattern or the like is preregistered. That is, in the present invention, biometric authentication is performed in addition to the normal authentication using IDs and passwords. With this, the present invention enhances prevention of leakage of secret information.

In addition, the access permission level of each manager is preregistered in the authentication data file 15e. Based on the registered access permission levels, the managers outside the airport can obtain necessary information.

Figure 9:
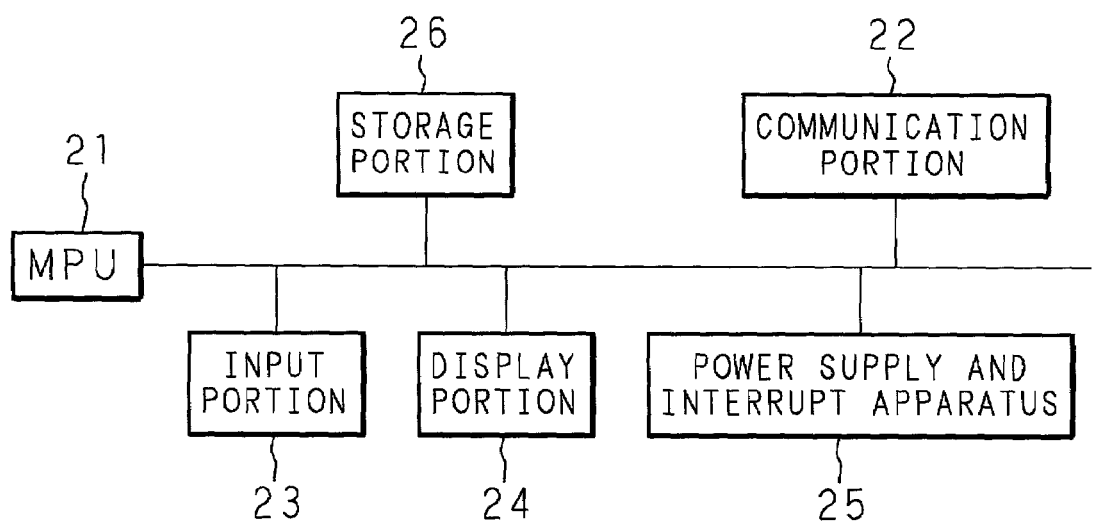
FIG. 9 is a block diagram showing the hardware configuration of terminal apparatuses.

FIG. 9 is a block diagram showing the hardware configuration of the terminal apparatuses 2. In the figure, reference numeral 22 represents a communication portion that transmits and receives information to and from the server computer 1. When an incident occurs and an incident occurrence signal is transmitted from the MPU 11 of the server computer 1, a power supply and interrupt apparatus 25 such as a switching circuit turns on the switch. The power supply and interrupt apparatus 25 supplies power to the terminal apparatus 2 to activate it.

After activation, an MPU 21 sounds an alarm of a non-illustrated alarm portion to attract the attention of the manager. Moreover, the MPU 21 displays information representing the occurrence of the incident on a display portion 24.

Then, the MPU 21 displays a message "Please enter your ID, password and fingerprint." on the display 24. When necessary information is entered on an input portion 23 such as a keyboard, a touch panel or a fingerprint reader, the MPU 21 accepts the identification information. The terminal apparatuses 2 transmit the accepted identification information to the server computer 1. The method of authentication will be described later.

When pieces of information to be provided satisfying the access level are transmitted one by one from the server computer 1 after authentication, the MPU 21 stores the contents of the information into a storage portion 26, and also displays them on the display portion 24. These pieces of information can be always called up by operating the input portion 23.

Further, a non-illustrated position measurement portion such as a GPS is provided, and the positions of the managers outside the airport are measured. The measurement information is managed by the server computer 1.

Figure 10:
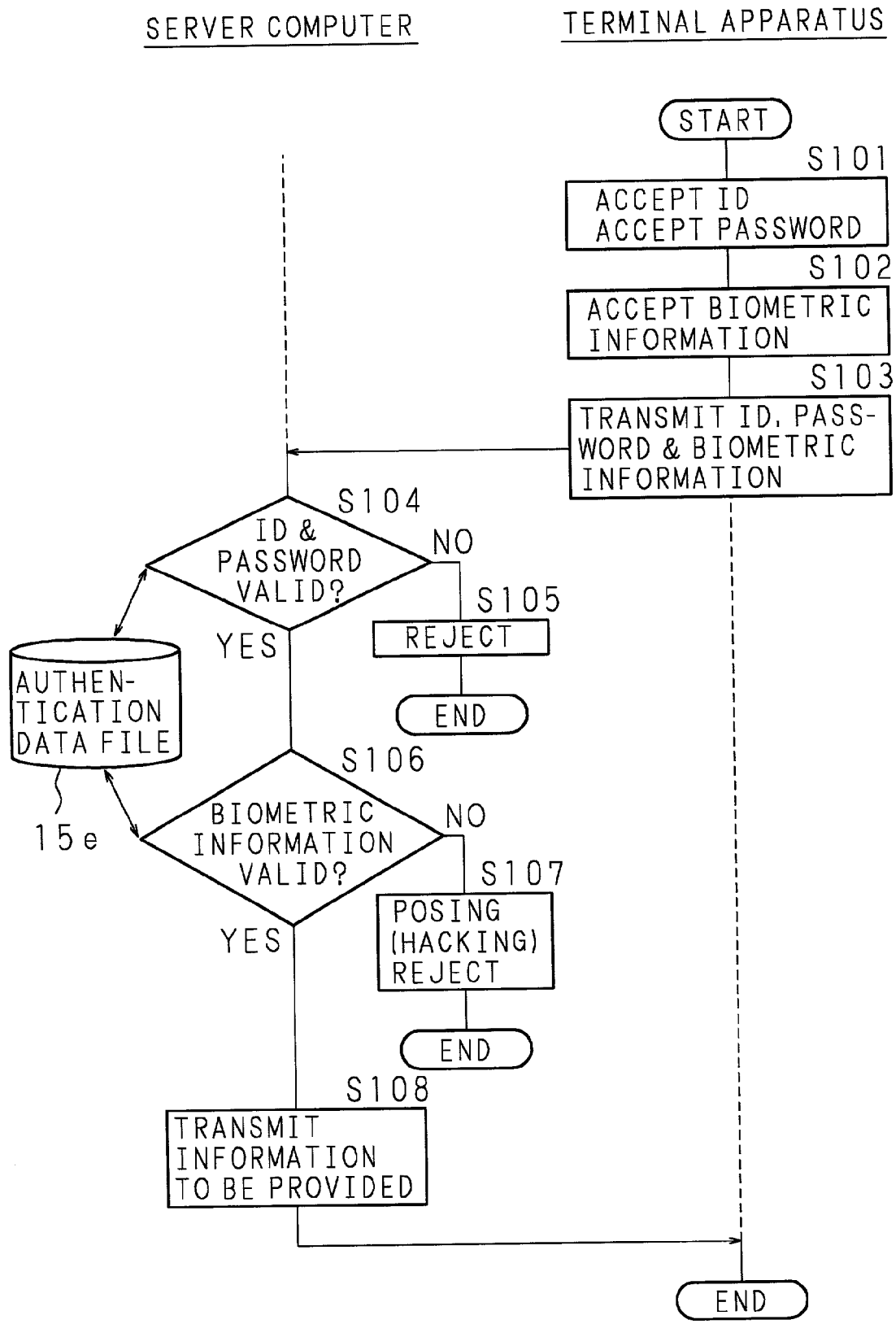
FIG. 10 is a flowchart showing the procedure of authentication of the managers outside the airport.

FIG. 10 is a flowchart showing the procedure of authentication of the managers outside the airport. First, the terminal apparatus 2 accepts the ID and the password entered from the input portion 23 (step S101). Then, the terminal apparatus 2 accepts the entered biometric information such as a fingerprint (step S102).

The terminal apparatus 2 transmits the ID, the password and the biometric information (identification information) to the server computer 1 (step S103). The terminal apparatus 2 may separately transmit the ID, the password and the biometric information.

The MPU 11 of the server computer 1, received these pieces of information, refers to the authentication data file 15e. Then, the MPU 11 determines whether the ID and the password are valid or not (step S104). When it is determined that they are invalid (NO at step S104), the MPU 11 determines that the access is unauthorized, and rejects it (step S105).

When it is determined that the ID and the password are valid (YES at step S104), the MPU 11 determines whether the transmitted fingerprint is valid or not by comparing it with the fingerprint registered in the authentication data file 15e (step S106).

When it is determined that the fingerprint is invalid (NO at step S106), since it is highly likely that a third party is hacking or posing as a manager to be provided with information, the MPU 11 determines that the access is unauthorized, and rejects it (step S107).

When it is determined that the fingerprint is valid (YES at step S106), the MPU 11 determines that the access is from an authorized user, and transmits the information to be provided, to the terminal apparatus 2 (step S108).

In the present embodiment, authentication of the ID is performed before authentication of biometric information such as a fingerprint is performed. However, authentication of the ID (including the password) may be performed after authentication of biometric information is performed.

Moreover, instead of performing authentication of all on the server side, authentication of biometric information such as a fingerprint may be performed on the side of the terminal apparatus 2 by use of a dedicated IC card system or the like.

Figure 11:
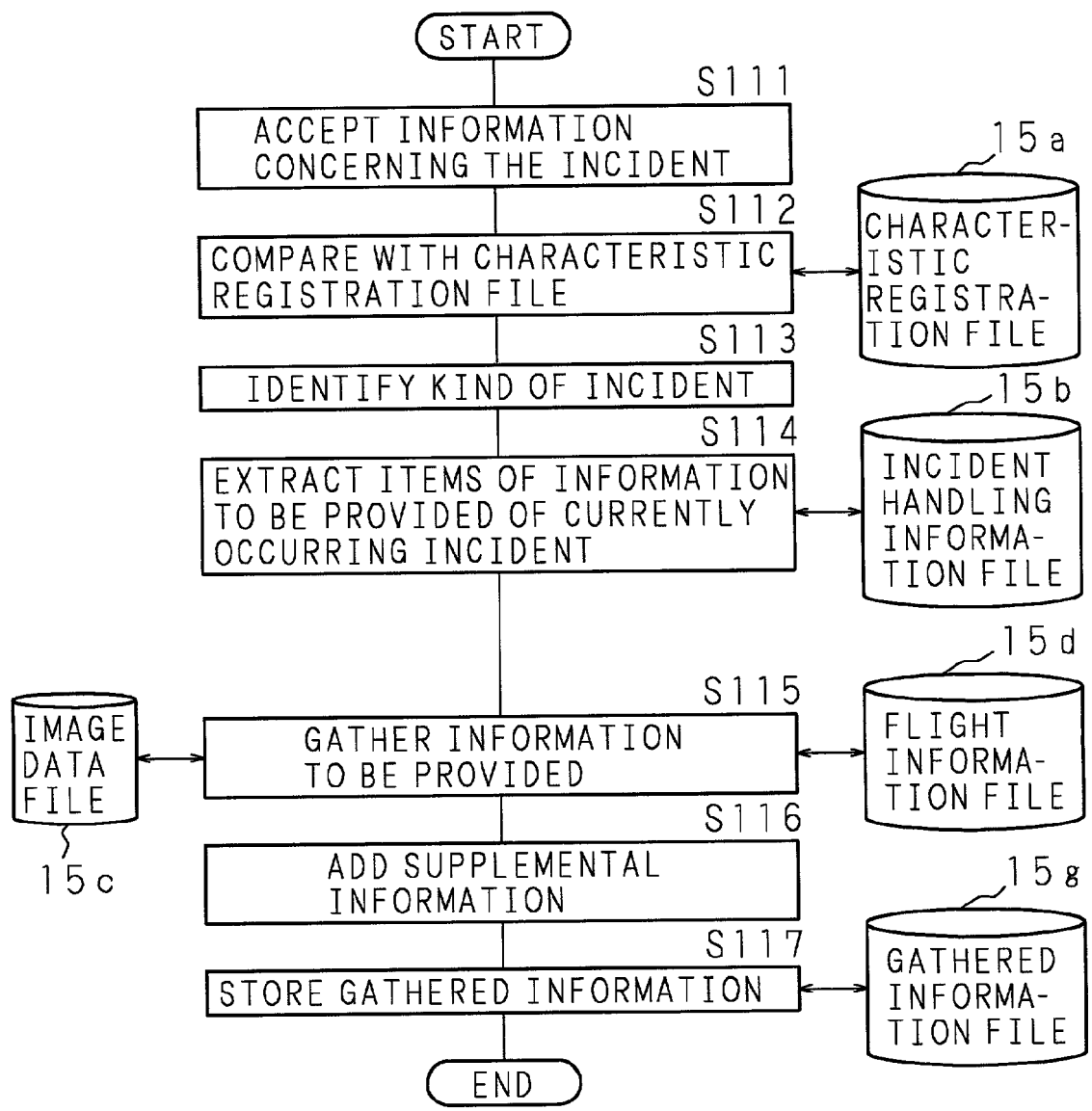
FIG. 11 is a flowchart showing the procedure of incident identification and information gathering by the server computer.

FIG. 11 is a flowchart showing the procedure of incident identification and information gathering by the server computer 1. When an incident occurs, first, the server computer 1 accepts information concerning the incident entered by the operator (see FIG. 3) (step S111). The server computer 1 compares the accepted information and the characteristic information registered in the characteristic registration file 15a by a technique such as pattern matching (step S112). The server computer 1 identifies the most analogous incident type (step S113). After determining the incident, the server computer 1 extracts the items of information to be provided associated with the currently occurring incident in consideration of the incident handling information file 15b (step S114).

For example, when the currently occurring incident is hijack political offense TYPE•B, the server computer 1 extracts items of information to be provided such as the relay from the spot, the flight details and the damage. Then, the server computer 1 gathers the extracted information to be provided (step S115). The server computer 1 stores the gathered pieces of information into the gathered information file 15g one by one.

For example, when the gathered information is the relay from the spot, of the image data stored in the image data file 15c, the stored data of from the instant of occurrence of the accident to the present time is stored in the gathered information file 15g by the server computer 1 (step S117).

Moreover, as flight information, the server computer 1 gathers the passenger list and the like with reference to the flight information file 15d. The server computer 1 stores the gathered information into the gathered information file 15g (step S117).

When information to be provided not included in the items of information to be provided (supplemental information) is present, the operator adds it (step S116). The additional information is stored into the gathered information file 15g.

In entering the supplemental information, the operator enters its access level and sequence information at the same time. As described above, the operator adds information not registered as a template, and server computer 1 provides this information flexibly. Thus, according to the present invention, sufficient information can be provided to the managers.

Figure 12A:
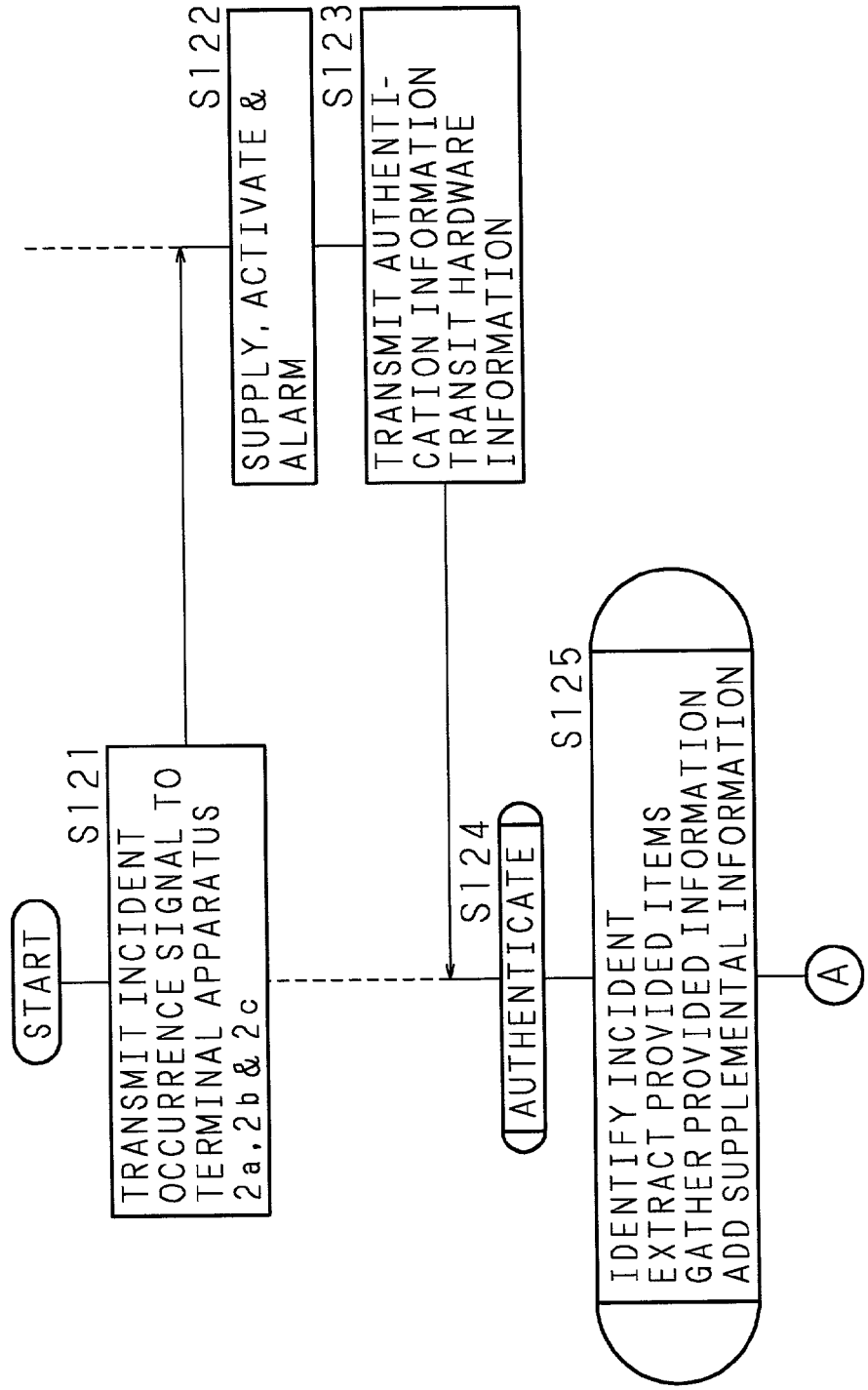
FIGS. 12A and B are a flowchart showing the procedure of processing by the crisis management system according to the present invention.
Figure 12B:
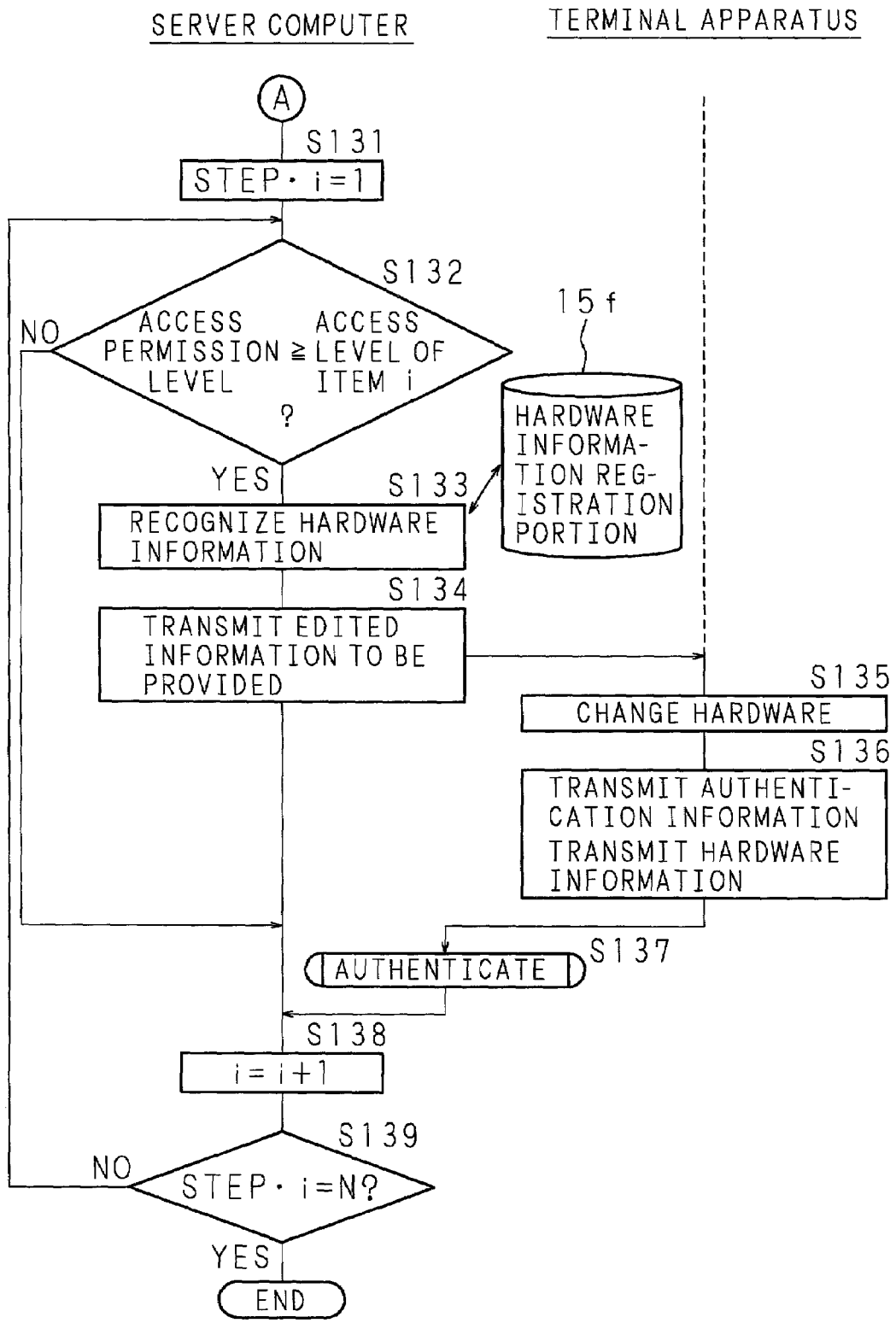

FIGS. 12A and B are flowcharts showing the procedure of processing by the crisis management system according to the present invention. When an incident occurs, first, the server computer 1 broadcasts an incident occurrence signal to the terminal apparatuses 2a, 2b and 2c (step S121). Receiving the incident occurrence signal, the power supply and interrupt apparatuses 25 turn on the switch with the incident occurrence signal as the trigger. The power supply and interrupt apparatuses 25 supply power to the terminal apparatuses 2 (step S122). The terminal apparatuses 2 are forcibly activated (step S122).

Alternatively, the terminal apparatuses 2 forcibly sound a ring tone (alarm) to provide notification of the occurrence of an incident (step S122). The managers outside the airport who have become aware of the occurrence of the incident transmit authentication information from the terminal apparatuses 2 (step S123). The authentication packet includes hardware information of the terminal apparatuses 2 as well as the ID, the password, the biometric information (authentication information). The hardware information is transmitted to the server computer 1 (step S123). Specifically, the code number such as the model name is transmitted.

The transmitted authentication information is authenticated by the procedure described at steps S101 to S108 (step S124). After the authentication or in parallel with the authentication, the server computer 1 identifies the incident or gathers the information to be provided (step S125). The processing at step S125 will not be described because it has been described at steps S111 to S117.

Then, the server computer 1 transmits to the terminal apparatuses 2 the information to be provided associated with the items of information to be provided shown in FIG. 6 in consideration of the access level restriction. First, the server computer 1 stores STEP•i=1 into the RAM 13 (step S131). The server computer 1 compares the access level of STEP•1 (the relay from the spot in the example of FIG. 6) and the transmitted access permission level of a manager. The server computer 1 determines whether or not the access permission level of the manager is equal to or higher than the access level of an item i(1) (step S132). When the access permission level of the manager is equal to or higher than the access level of the item i (YES at step S132), the server computer 1 recognizes the hardware information of the terminal apparatus 2 with reference to the hardware information registration portion 15f (step S133).

The server computer 1 edits the information to be provided (the relay from the spot). The server computer 1 transmits to the terminal apparatus 2 the edited information to be provided (step S134). For example, when the manager is out for shopping, he requests reception of information through his portable telephone (terminal apparatus 2b). The hardware information represents the portable telephone. The server computer 1 performs edits such as adjustment of the number of frames and compression of image data with reference to the hardware information registration portion 15f. The server computer 1 transmits the edited information.

When the access permission level of the manager is lower than the access level of the item i (NO at step S132), since it is necessary to keep the information from the manager, the server computer 1 does not transmit the information to the manager. Then, to provide the information of the next STEP•i+1, the server computer 1 increments the STEP•i stored in the RAM 13 (step S138). Then, the server computer 1 determines whether the incremented STEP•i reaches the maximum information provision number N or not (step S139). That is, the server computer 1 determines whether all of the items of information to be provided in FIG. 6 have been provided (STEP N) or not. When information to be provided is left, that is, when STEP•i is not N (NO at step S139), the server computer 1 shifts to step S132 to repeat the processing. When STEP•i reaches N (YES at step S139), since all the information has been transmitted, the server computer 1 ends all the processing.

In the description given above, there is no change of the kind of the terminal apparatus 2 in the middle of the transmission and reception of the information (for example, change from the portable telephone to the computer in the manager's home). However, there are cases where the kind of the terminal apparatus 2 is changed. The processing performed when the kind of the terminal apparatus 2 is changed will be described. For example, the following is assumed: A manager is informed of the occurrence of an incident through the terminal apparatus 2b (portable telephone) while out for shopping. The manager receives information up to STEP•i. Then, the manager returns home, and the hardware is changed to the terminal apparatus 2a in the manager's home. When the hardware is changed after the information to be provided is transmitted at step S134 (step S135), authentication is performed again. The terminal apparatus 2 transmits the authentication information to the server computer 1 (step S136). After performing authentication (step S137), the server computer 1 increments STEP•i (step S138).

Then, when the server computer 1 shifts to step S132 and determines that the access permission level of the manager is equal to or higher than the access level (YES at step S132), the server computer 1 recognizes the hardware information based on the hardware information transmitted at step S136 and the hardware information registration portion 15f (step S133).

Then, the server computer 1 edits the information to be provided based on the hardware information of after the hardware change (step S134). The server computer 1 transmits the information of STEP•i+1 to the changed terminal apparatus 2 (step S134). With this configuration, even after the hardware is changed, information can be provided in accordance with the changed hardware. Moreover, it is unnecessary to receive the already received information of STEP•1 to STEP•i once again. Thus, the present invention enables the managers to obtain information promptly.

In the present embodiment, the already obtained information is not obtained again. However, the present invention may be structured so that the information to be provided received through a different kind of hardware is received again.

Moreover, the terminal apparatuses 2 have a non-illustrated position measurement portion such as a GPS. When the terminal apparatus 2b (portable telephone) determines that the manager is near his home, the information that the manager is near his home is transmitted to the server computer 1. The server computer 1 may transmit information before the manager reaches his home.

Further, in the present embodiment, the crisis management has been described as that associated with airports. However, the present invention is not limited thereto. It is to be noted that the crisis management of the present invention may be national-level emergency information management, crisis management for cases of earthquakes and crisis management for police officers or fire persons.

Second Embodiment

Figure 13:
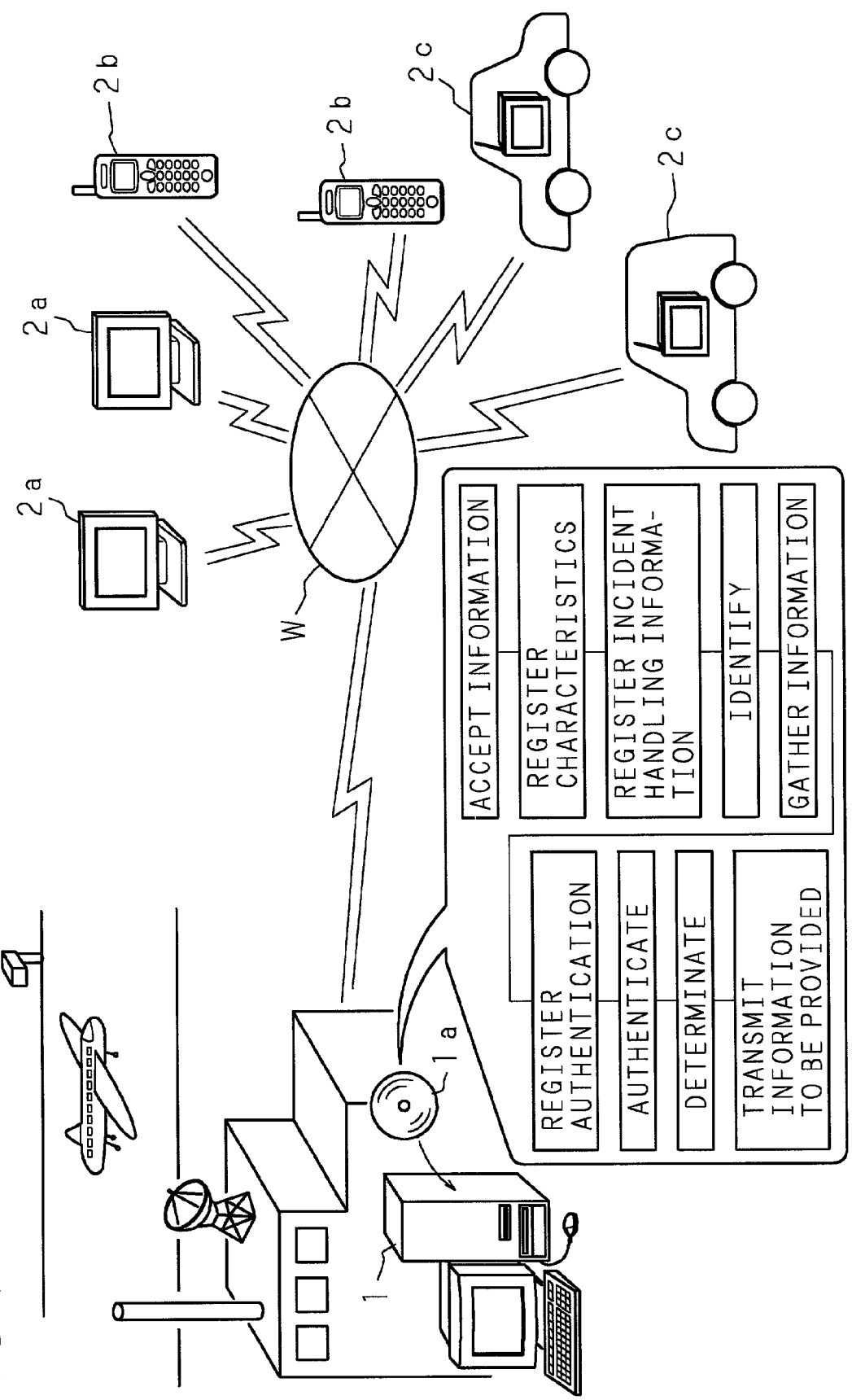
FIG. 13 is a schematic view showing the configuration of a crisis management system according to a second embodiment.

FIG. 13 is a schematic view showing the configuration of a crisis management system according to a second embodiment. In the storage portion 15 such as a hard disk of the server computer 1, a computer memory product 1a (a CD-ROM, an MO or a DVD-ROM) shown in FIG. 13 is installed. In the computer memory product 1a, a program is stored that causes the server computer 1 to accept the input information, register characteristics, register incident handling information, identify the kind of the incident, gather the information to be provided, register authentication data, perform authentication based on the authentication data, determine whether the transmitted access permission level is lower than the access level or not and transmit the information to be provided. The program is loaded into the RAM 13 of the server computer 1 for execution. With this, the server computer functions as the server computer 1 of the present invention as described above.

The second embodiment has a configuration as described above, and since the configuration and operations are the same as those of the first embodiment except this, corresponding parts are designated by the same reference numerals and detailed descriptions thereof are omitted.

As this invention may be embodied in several forms without departing from the spirit of essential characteristics thereof, present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A crisis management system comprising:
   a server computer, in response to an occurrence of an incident, transmitting and receiving information concerning the incident; and
   a terminal apparatus which is connected to the server computer through a communication network,
   wherein the server computer includes:
      a characteristic registration file in which incident types and characteristic information for each incident are registered;
      an incident handling information file in which incident handling information, for each of the incident type, including a plurality of items of information to be provided and an access level decided for each of the items of information to be provided is registered; and
      a processor connected to the characteristic registration file and to the incident handling information file, and being capable of performing the following operations:
         accepting the information concerning the incident;
         identifying the incident type based on the accepted information concerning the incident and the characteristic registration file; and
         gathering information to be provided, with respect to the identified incident type, which information is associated with an item of information to be provided registered in the incident handling information file,
   wherein the terminal apparatus includes a processor capable of performing the following operations;

accepting a unique identifier assigned to a manager;
accepting biometric information of the manager; and
transmitting to the server computer identification Information including the accepted identifier and biometric information, and wherein the server computer further includes an authentication data file in which authentication data including an identifier, biometric information and an access permission level of each manager is preregistered, and wherein the processor of the server computer is further capable of performing the following operations:

authenticating the manager based on the transmitted identifier and biometric information of the manager and the identifier and biometric information registered in the authentication data file;

determining whether to permit access to the information to be provided or not based on the access level of the item of information to be provided associated with the identified incident type and the access permission level of the authenticated manager; and when it is determined that the access is permitted, transmitting to the terminal apparatus the gathered information to be provided associated with the item of information to be provided.

2. A crisis management system according to claim 1, wherein
the incident handling information further includes sequence information in which the items of information to be provided are provided, and
the information to be provided is transmitted to the terminal apparatus according to the sequence information.

3. A crisis management system according to claim 1, wherein
when the identification information is transmitted to the server computer, hardware information of the terminal apparatus is also transmitted, and
when it is determined that the access is permitted, the gathered information to be provided is edited based on the transmitted hardware information, and then, the edited information to be provided is transmitted to the terminal apparatus.

4. A crisis management system according to claim 2, wherein
when the identification information is transmitted to the server computer, hardware information of the terminal apparatus is also transmitted, and
when it is determined that the access is permitted, the gathered information to be provided is edited based on the transmitted hardware information, and then, the edited information to be provided is transmitted to the terminal apparatus.

5. A crisis management system according to claim 1, further comprising:
a power supply and interrupt apparatus that supplies and interrupts power to the terminal apparatus,
the processor of the server computer further capable of performing an operation of transmitting an incident occurrence signal to the power supply and interrupt apparatus, and
the power supply and interrupt apparatus including a processor capable of performing an operation of supplying power to the terminal apparatus based on the incident occurrence signal.

6. A crisis management system according to claim 2, further comprising:
a power supply and interrupt apparatus that supplies and interrupts power to the terminal apparatus,
the processor of the server computer further capable of performing an operation of transmitting an incident occurrence signal to the power supply and interrupt apparatus, and
the power supply and interrupt apparatus including a processor capable of performing an operation of supplying power to the terminal apparatus based on the incident occurrence signal.

7. A crisis management system according to claim 3, further comprising:
a power supply and interrupt apparatus that supplies and interrupts power to the terminal apparatus,
the processor of the server computer further capable of performing an operation of transmitting an incident occurrence signal to the power supply and interrupt apparatus, and
the power supply and interrupt apparatus including a processor capable of performing an operation of supplying power to the terminal apparatus based on the incident occurrence signal.

8. A computer, in response to an occurrence of an incident, transmitting and receiving information concerning the incident to and from a second computer, said computer comprising:
a processor capable of performing the following operations:
accepting the information concerning the incident;
identifying an incident type based on the accepted information concerning the incident and a characteristic registration file in which incident types and characteristic information for each incident are registered;
gathering information to be provided, with respect to the identified incident type, which information is associated with an item of information to be provided registered in an incident handling information file in which incident handling information, for each of the incident type, including a plurality of items of information to be provided and an access level decided for each of the items of information to be provided is registered;
authenticating a manager based on an identifier and biometric information of the manager transmitted from the second computer and an identifier and biometric information registered in an authentication data file in which authentication data including an identifier, biometric information and an access permission level of each manager is preregistered;
determining whether to permit access to the information to be provided or not based on the access level of the item of information to be provided associated with the identified incident type and the access permission level of the authenticated manager; and
when it is determined that the access is permitted, transmitting to the second computer the gathered information to be provided associated with the item of information to be provided.

9. A computer according to claim 8, wherein
the incident handling information further includes sequence information in which the items of information to be provided are provided, and
when the information to be provided is transmitted to the second computer, the information to be provided is transmitted to the second computer according to the sequence information.

10. A computer according to claim 8, wherein when it is determined that the access is permitted, the gathered information to be provided is edited based on hardware information of the second computer transmitted from the second computer, and then, the edited information to be provided is transmitted to the second computer.

11. A computer according to claim 9, wherein when it is determined that the access is permitted, the gathered information to be provided is edited based on hardware information of the second computer transmitted from the second computer, and then, the edited information to be provided is transmitted to the second computer.

12. A computer memory product in which a computer program is stored that transmits and receives, in response to an occurrence of an incident, information concerning the incident to and from a second computer, the computer program performing a method comprising:
   accepting the information concerning the incident;
   identifying incident type based on the accepted information concerning the incident and a characteristic registration file in which incident types and characteristic information for each incident are registered;
   gathering information to be provided, with respect to the identified incident type, which information is associated with an item of information to be provided registered in an incident handling information file in which incident handling information, for each of the incident type, including a plurality of items of information to be provided and an access level decided for each of the items of information to be provided are registered;
   authenticating a manager based on an identifier and biometric information of the manager transmitted from the second computer and an identifier and biometric information registered in an authentication data file in which authentication data including an identifier, biometric information and an access permission level of each manager is preregistered;
   determining whether to permit access to the information to be provided or not, based on the access level of the item of information to be provided associated with the identified incident type and the access permission level of the authenticated manager; and
   when it is determined that the access is permitted, transmitting to the second computer the gathered information to be provided associated with the item of information to be provided.

13. A crisis management system comprising:
   a server computer, in response to an occurrence of an incident, transmitting and receiving information in concerning the incident; and
   a terminal apparatus which is connected to the server computer through a communication network,
   wherein the server computer includes:
      means for accepting the information concerning the incident;
      a characteristic registration file in which incident types and characteristic information for each incident are registered;
      an incident handling information file storing incident handling information for each of the incident types, including a plurality of items of information to be provided and an access level decided for each of the items of information to be provided;
      means for identifying the incident type based on the accepted information concerning the incident and the characteristic registration file; and
      means for gathering information to be provided, with respect to the identified incident type, which information is associated with an item of information to be provided registered in the incident handling information file,
   wherein the terminal apparatus includes:
      means for accepting a unique identifier assigned to a manager;
      means for accepting biometric information of the manager; and
      means for transmitting to the server computer identification information including the accepted identifier and biometric information, and
   wherein the server computer further includes:
      an authentication data file in which authentication data including an identifier, biometric information and an access permission level of each manager is preregistered;
      means for authenticating the manager based on the transmitted identifier and biometric information of the manager and the identifier and biometric information registered in the authentication data file;
      means for determining whether to permit access to the information to be provided or not, based on the access level of the item of information to be provided associated with the identified incident type and the access permission level of the authenticated manager; and
      means for, when it is determined that the access is permitted, transmitting to the terminal apparatus the gathered information to be provided associated with the item of information to be provided.

14. A computer, in response to an occurrence of an incident, transmitting and receiving information concerning the incident to and from a second computer, said computer comprising:
   means for accepting the information concerning the incident;
   a characteristic registration file in which incident types and characteristic information for each incident are registered;
   an incident handling information file in which incident handling information, for each of the incident type, including a plurality of items of information to be provided and an access level decided for each of the items of information to be provided are registered;
   means for identifying the incident type, based on the accepted information concerning the incident and the characteristic registration file;
   means for gathering information to be provided, with respect to the identified incident type, which information is associated with an item of information to be provided registered in the incident handling information file;
   an authentication data file in which authentication data including an identifier, biometric information and an access permission level of each manager is preregistered;
   means for authenticating a manager based on the identifier and biometric information of the manager transmitted from the second computer and the identifier and biometric information registered in the authentication data file;
   means for determining whether to permit access to the information to be provided or not, based on the access level of the item of information to be provided associated with the identified incident type and the access permission level of the authenticated manager; and means for, when it is determined that the access is permitted, transmitting to the second computer the gathered information to be provided associated with the item of information to be provided.

* * * * *

UNITED STATES PATENT AND TRADEMARK OFFICE
CERTIFICATE OF CORRECTION

| | |
|---|---|
| PATENT NO. | : 7,111,164 B2 |
| APPLICATION NO. | : 09/875861 |
| DATED | : September 19, 2006 |
| INVENTOR(S) | : Kiyotaka Kinoshita |

It is certified that error appears in the above-identified patent and that said Letters Patent is hereby corrected as shown below:

Column 13, Line 3-4, change "Information" to --information--.

Column 15, Line 49, after "information" delete "in".

Signed and Sealed this

Twenty-third Day of January, 2007

JON W. DUDAS
*Director of the United States Patent and Trademark Office*